United States Patent
Komatsu

(10) Patent No.: US 9,799,118 B2
(45) Date of Patent: Oct. 24, 2017

(54) IMAGE PROCESSING APPARATUS, IMAGING APPARATUS AND DISTANCE CORRECTION METHOD

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/528,250

(22) Filed: Oct. 30, 2014

(65) Prior Publication Data
US 2015/0139534 A1    May 21, 2015

(30) Foreign Application Priority Data
Nov. 15, 2013  (JP) .................. 2013-236590

(51) Int. Cl.
| | |
|---|---|
| G06K 9/00 | (2006.01) |
| G06T 7/00 | (2017.01) |
| G06T 7/536 | (2017.01) |
| G06T 7/593 | (2017.01) |
| G06T 7/62 | (2017.01) |

(52) U.S. Cl.
CPC ............ G06T 7/0075 (2013.01); G06T 7/536 (2017.01); G06T 7/593 (2017.01); G06T 7/62 (2017.01); G06T 2207/30201 (2013.01)

(58) Field of Classification Search
None
See application file for complete search history.

(56) References Cited

U.S. PATENT DOCUMENTS

| | | | | |
|---|---|---|---|---|
| 5,809,161 A | * | 9/1998 | Auty | .................. G01P 3/38 340/937 |
| 8,761,492 B2 | | 6/2014 | Hirai et al. | |
| 2007/0274592 A1 | * | 11/2007 | Matsuhira | ............ H04N 1/6027 382/190 |
| 2012/0113117 A1 | | 5/2012 | Nakayama et al. | |
| 2013/0300860 A1 | | 11/2013 | Komatsu | |
| 2013/0307966 A1 | | 11/2013 | Komatsu | |

FOREIGN PATENT DOCUMENTS

| | | | |
|---|---|---|---|
| JP | 2009-180661 A | 8/2009 | |
| JP | 2012100183 | * 11/2010 | ........... H04N 1/6027 |

(Continued)

OTHER PUBLICATIONS

Lipton, "Moving Target Classification and Tracking from Real-time Video", IEEE 1998.*

(Continued)

*Primary Examiner* — Mark Roz
(74) *Attorney, Agent, or Firm* — Fitzpatrick, Cella, Harper & Scinto

(57) ABSTRACT

An image processing apparatus for correcting, on the basis of an image and a depth map corresponding to the image, the depth map, includes: a detection unit that detects an object included in the image; a determination unit that determines whether a size of the object detected by the detection unit is a threshold or less; and a correction unit that corrects a distance in a target area which corresponds to an area of the object in the depth map, when the size of the detected object is the threshold or less.

26 Claims, 8 Drawing Sheets

(56) References Cited

FOREIGN PATENT DOCUMENTS

| JP | 2012078942 A | 4/2012 |
|----|--------------|--------|
| JP | 2012103135 A | 5/2012 |

OTHER PUBLICATIONS

Unsharp Filter—Spatial Filters Tutorial, http://homepages.inf.ed.ac.uk/rbf/HIPR2/unsharp.htm, confirmed available on Web Archive on Jun. 2004.*
Garcia et al, Face Detection Using Quantized Skin Color Regions Merging and Wavelet Packet Analysis, IEEE 1999.*
F. Schlink Variance of Measuring Instruments and Its Relation to Accuracy and Sensitivity, published by National Bureau of Standards 1919.*

* cited by examiner

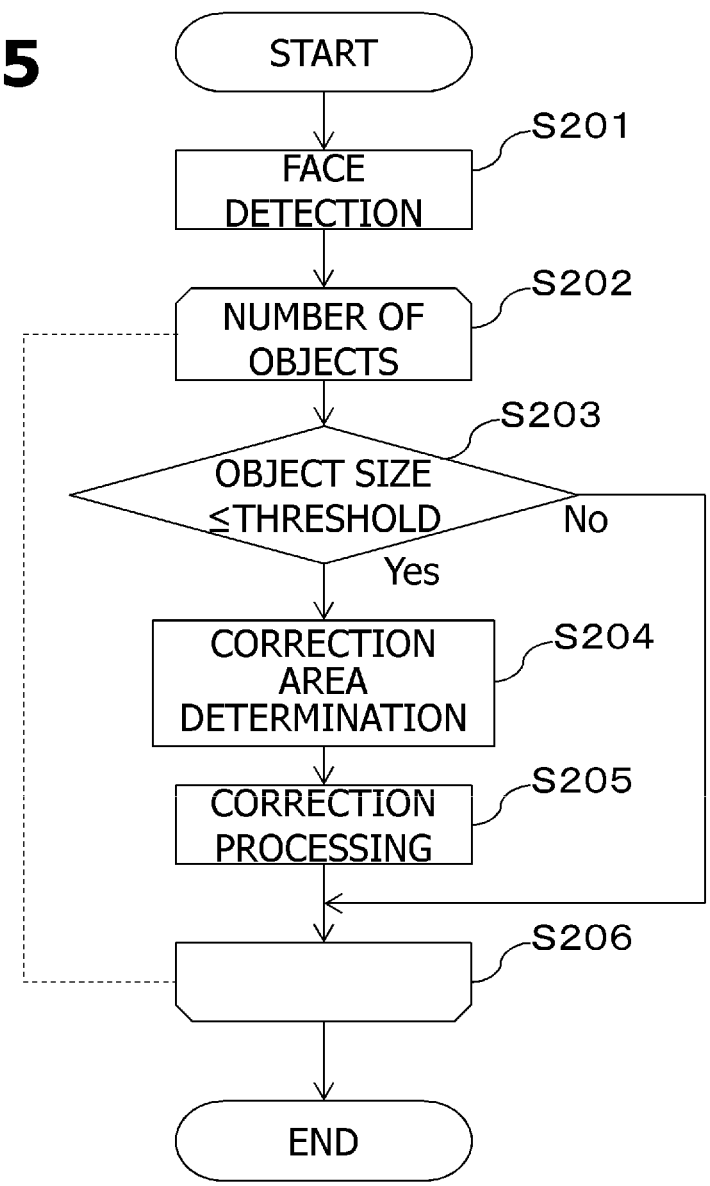

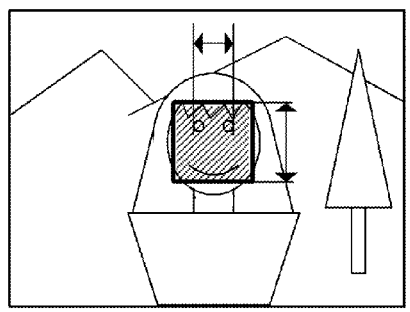 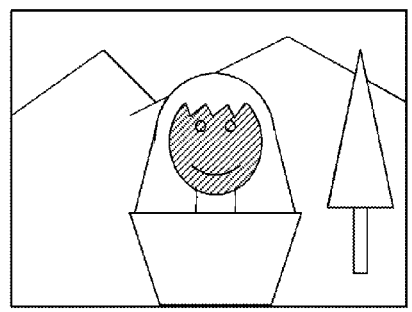
FIG. 6A  FIG. 6B
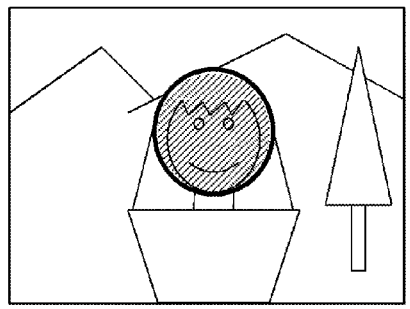 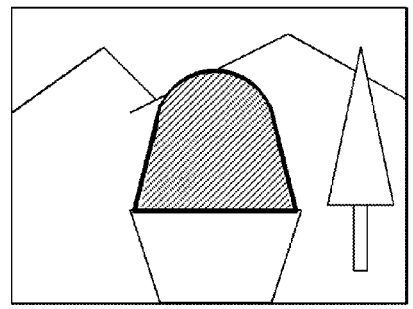
FIG. 6C  FIG. 6D
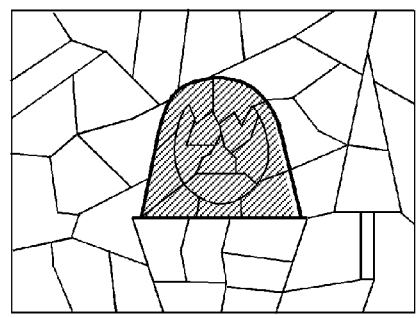
FIG. 7

IMAGE PROCESSING APPARATUS, IMAGING APPARATUS AND DISTANCE CORRECTION METHOD

BACKGROUND OF THE INVENTION

Field of the Invention

The present invention relates to an image processing apparatus, and more particularly to a technique to correct a depth map.

Description of the Related Art

A technique to estimate distance using a plurality of captured images based on a stereo method, a depth from defocus (DFD) method, a depth from focus (DFF) method or the like and generate a depth map (also referred to as distance image) has been proposed. The stereo method is a technique to calculate a depth (also referred to as distance) based on a plurality of images photographed from different viewpoints. The DFD method and the DFF method are technique to calculate a distance based on a plurality of images of which photographing parameters are different. Distance images generated by these technique include errors, which lead to deterioration of quality of application that uses the depth maps.

To solve this problem, Patent Literature 1 proposes a technique to correct the depth map. In Patent Literature 1, clustering processing is performed on at least one of the pixel values and the distance values of an image, and a representative distance value in the created-cluster is generated. Then distances are corrected by replacing the distances of the correction target pixels with the representative value of the cluster corresponding to the correction target pixels.

To more accurately determine a distance for each object, Patent Literature 2 proposes a method to detect an object included in the image, and to estimate a distance of the object in the image using a model having distance information.

Patent Literature 1: Japanese Patent Application Publication No. 2012-078942

Patent Literature 2: Japanese Patent Application Publication No. 2012-b 103135

SUMMARY OF THE INVENTION

In the case of a depth map estimated by the stereo method, the DFD method or the DFF method, it is known that distance estimation errors occur and measurement errors increase particularly in an area having little texture in a photographed image. If the size of a photographed object having texture is in the image, the texture of the object disappears in the photographed image, which increases distance estimation errors. If an object having a lot of texture is in the image, and the size of this object is large, then distance can be calculated with relative accuracy.

In the case of the correction method disclosed in Patent Literature 1, the distance is corrected using clustering without considering distance estimation accuracy. Since distance estimation accuracy is not considered, correction processing is performed even for a portion where distance was calculated accurately, and deviation from the correct distance may further increase. Furthermore, the distance is corrected using areas generated by dividing the local areas by clustering, hence correction to make the distance of each object the same cannot be performed.

In Patent Literature 2, distance to be a base is assumed for each scene, the distance model of each object is stored in advance, and the depth map is estimated by applying this distance model to the distance to be a base. This technique allows acquiring the distance of each object, but it is a technique that applies prepared distance information to a photographed scene, rather than estimating a distance from a change in the plurality of photographed images. Another problem is that major errors occur to the estimated distance if the distance to be a base and the positional relationship of each object are incorrect.

With the foregoing in view, it is an object of the present invention to provide a technique to generate an accurate depth map by correcting a distance (depth) in a depth map only for an area of which distance cannot be correctly estimated.

A first aspect of the present invention is an image processing apparatus for correcting a depth map corresponding to an image, comprising: a detection unit configured to detect an object included in the image; a determination unit configured to determine whether a size of the object detected by the detection unit is equal to or less than a threshold; and a correction unit configured to correct a distance in a target area which corresponds to an area of the object in the depth map, when the size of the detected object is equal to or less than the threshold.

A second aspect of the present invention is a distance correction method executed by a computer for correcting a depth map corresponding to an image, comprising: a detection step of detecting an object included in the image; a determination step of determining whether a size of the object detected in the detection step is equal to or less than a threshold; and a correction step of correcting a distance in a target area in the depth map which corresponds to an area of the object, when the size of the detected object is equal to or less than the threshold.

According to the present invention, distance (depth) in a depth map can be corrected only for an area of which distance cannot be correctly estimated, therefore an accurate depth map can be acquired.

Further features of the present invention will become apparent from the following description of exemplary embodiments with reference to the attached drawings.

BRIEF DESCRIPTION OF THE DRAWINGS

FIG. 5 is a flow chart depicting the image processing according to Embodiment 2;

FIG. 6A to FIG. 6D are examples of a face detection result according to Embodiment 2;

FIG. 7 is an example of an area division result according to Embodiment 2;

DESCRIPTION OF THE EMBODIMENTS

<Embodiment 1>

Figure 1:
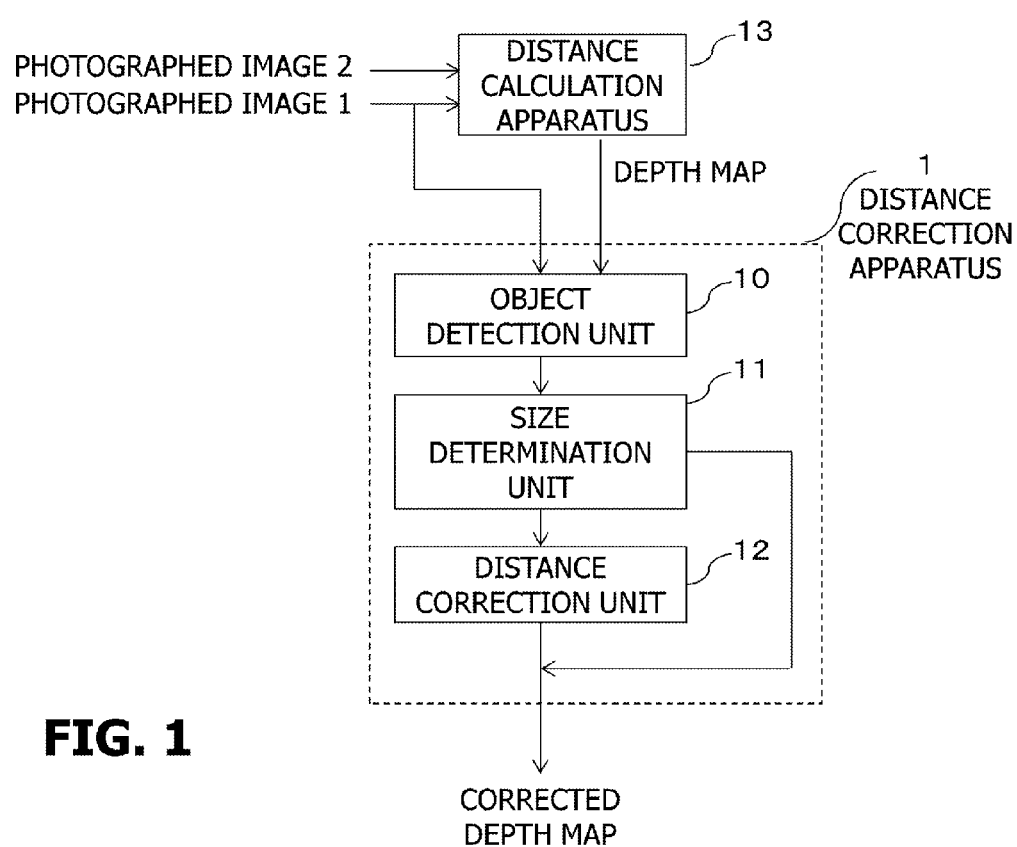
FIG. 1 is a block diagram depicting a configuration of an image processing apparatus according to Embodiment 1.

FIG. 1 is a block diagram depicting a configuration of an image processing apparatus according to Embodiment 1 of the present invention. The image processing apparatus is constituted by a distance calculation apparatus 13 and a distance correction apparatus 1. The distance correction apparatus 1 includes an object detection unit 10, a size determination unit 11, and a distance correction unit 12.

The distance calculation apparatus 13 is a functional unit that receives a plurality of images as an input, and generates a depth map (distance image) corresponding to the input images. A specific algorithm for the distance calculation can be arbitrary, but the distance (depth) correction processing to be described herein below can be suitably applied to a depth map generated by a passive distance calculation method. Examples of the passive distance calculation method are the stereo method, the DFD method and the DFF method. The stereo method receives a plurality of images having different viewpoints as an input, and calculates a distance based on the parallax among these images. The DFD method receives a plurality of images having different photographing parameters as an input, and calculates a relative distance from the focus position based on the difference of blur amounts among the images. The DFF method receives a plurality of images having different photographing parameters as an input, and calculates a distance based on the focus position when the focusing is the optimum.

The distance calculated by the distance calculation apparatus 13 may be the absolute distance to the target object or may be the relative distance from the focus position. In the case of calculating the relative distance, the distance from the focus position may be converted into the absolute distance.

The object detection unit 10 receives, as input images, a distance calculation apparatus 13 and one of the photographed images used for generating the depth map. The depth map to be inputted is preferably an image focused on the main object. The photographed image that is inputted need not always be an image used for calculating the distance.

The object detection unit 10 detects objects existing in an image, and outputs information on a position and an area of each object. When objects are detected, such details as what the object actually is may be detected, but only such a general classification as the type of object may be detected. For the detection method, a known method may be used, such as a method of identifying an object from an input image using an identification apparatus based on the learned data on each object. In the present invention, the method for detecting an object is not limited to this, but other detection methods may be used. Further, it is not necessary to detect all the objects that exist in the image, but only specific objects, such as individuals, vehicles and flowers, may be detected.

The size determination unit 11 calculates the size of the object in the image for each object detected by the object detection unit 10, and determines whether the size of the object is a threshold or less. The size of an object here refers to any one of the height (vertical length), width (horizontal length) and area of the object in the image, and at least one of these values is used for the determination. In this case, the threshold may be constant regardless what the target object is, but it is preferable to use different values depending on the size of the object or the surface texture of the object. If the size of the object is the threshold or less, the size determination unit 11 determines that it is necessary to correct the distance of the object by the distance correction unit 12.

The distance correction unit 12 corrects the distance for an object for which the size determination unit 11 determined necessary to correct the distance, and outputs the corrected depth map. For the correction method, a mean value of the distances in the object area is calculated as a representative value, and the distances in the object area are replaced with the representative value. Alternately a median or a mode of the distances in the object area may be used as the representative value.

Figure 2:
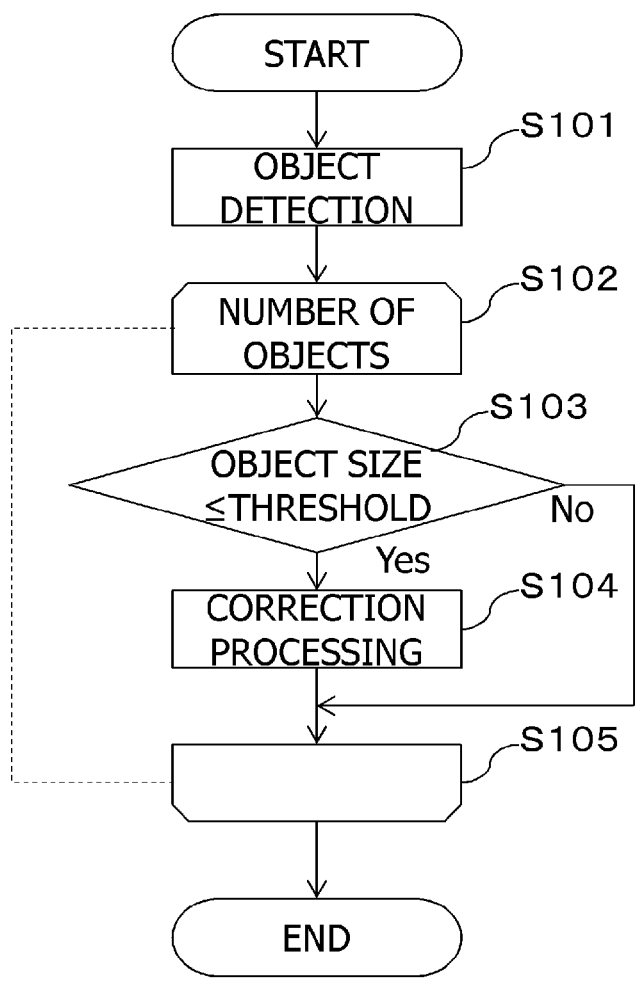
FIG. 2 is a flow chart depicting the image processing according to Embodiment 1.

Now a flow of the distance correction method (image processing method) in the image processing apparatus according to this embodiment will be described with reference to FIG. 2. FIG. 2 is a flow chart depicting a flow of the distance correction method according to this embodiment.

Figure 3:
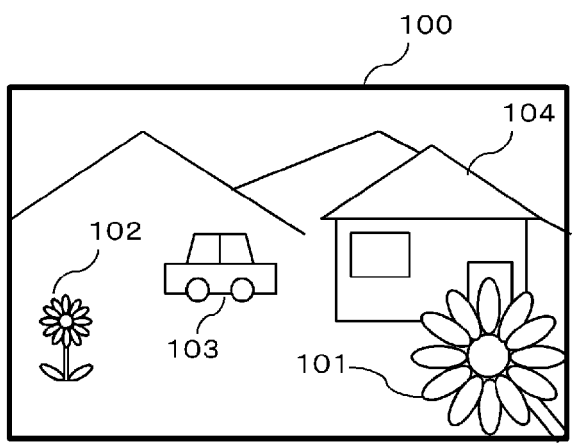
FIG. 3 shows an example of an input image.

First at least one image among the images used for distance estimation (hereafter simply called "image" to differentiate it from the depth map or distance image), and an estimated depth map are inputted to the distance correction apparatus 1 as input images. FIG. 3 shows an example of a photographed image (image 100) out of the input images. The depth map may be data that indicates the absolute distance from the imaging apparatus, or may be data that indicates a relative distance from a specific object in the image. In the case of the relative distance, a relative distance from a focused object is normally shown. The depth map need not always be an image that indicates the distance itself, and may be for example an image that indicates parallax or the defocus amount corresponding to the distance.

The image 100 is inputted to the object detection unit 10, and the object detection processing is executed (S101). By the object detection, a position and an area are detected for each object, such as the front flower 101, the rear flower 102, the vehicle 103 and the house 104, in the case of the image 100. The position detected here shows center coordinates or barycentric coordinates. The area detected here may be an area that matches the shape of the object, or may also be a simple graphic shape, such as a rectangle or an ellipse that circumscribes or inscribes the object. As the area information other than the shape, the maximum vertical and horizontal lengths and the area of the detected shape may be detected. Furthermore, the object detection unit 10 may output the type information (in this example, house, vehicle and flower) as well as the attached information. The detected information on these objects are stored in a memory or the like (not illustrated).

The determination processing by the size determination unit 11 and the correction unit 12 by the distance correction unit are repeated for a number of detected objects (S102 to S105). The size determination processing (S103) is a processing to determine an object that has a high error generation probability when the distance is estimated.

In a case where the size of an object in the image is small, the distance estimation error is easily generated since the detailed texture of the object is not recorded. This is because, in the case of the stereo method, corresponding points cannot be searched if texture is not present, and in the case of the DFD method or the DFF method, the change of blur cannot be detected if the texture is not present. Not only are errors generated, but in some cases it may also become impossible to estimate the distance information. For such areas, a more correct distance can be estimated by performing the distance correction processing.

If the object size in an image is large, on the other hand, the generation of distance estimation errors is lessened since the texture of the object can be recorded in detail. And if the correction processing is performed on an area of which distance estimation error is small, deviation from the correct distance could increase.

Due to such a relationship between the object size and the distance estimation accuracy, the distance correction apparatus 1 according to this embodiment determines whether the distance correction processing is performed or not, depending on whether the object size is a threshold or more. By this simple processing, the distance estimation accuracy can be determined. Further, only an area of which distance estimation accuracy is low and which requires correction can be corrected efficiently.

The object size for which the determination processing is performed is given by at least one of the vertical size (vertical length), the horizontal size (horizontal length) and the area of the detected object in the image. Here a case of determining the vertical size or the horizontal size of the front flower 101 in the image 100 is described as a concrete example of the determination processing. The size determination unit 11 acquires the vertical and horizontal sizes of the front flower 101 detected by the object detection unit 10, the type of the object which is a "flower", the vertical and horizontal sizes of the image, and information on whether this image was photographed vertically or horizontally. Since the image 100 was photographed horizontally, the size determination unit 11 compares the size of the short side of the image and the vertical size of the flower, or the size of the long side of the image and the horizontal size of the flower. If the flower size, with respect to the image size, is greater than a threshold, processing does not advance to the correction processing S104, but advances to the loop S105, and if there is a subsequent object, processing returns to S102 and the size determination is repeated. If the size of the flower with respect to the image size is the threshold or less, processing advances to the correction processing S104, and the distance correction unit 12 executes the distance correction for the flower area.

For example, a 0.3 ratio of the image size and the object size can be used as the threshold. In the case of this example, the ratio of the vertical side of the flower 101 to the size of the short size of the image is approximately 0.5, therefore it is judged to be greater than the threshold.

Although the size of the short side of the image and the vertical size of the flower 101 are compared in this example, the size of the long side of the image and the horizontal size of the flower 101 may be added to the determination process. The ratio of the area (number of pixels) of the flower 101 to the area (number of pixels) of the image may be used for the determination process. A comparison of the areas is effective when there is no information on whether an image was photographed vertically or horizontally. Furthermore, if there is no information on whether the image was photographed vertically or horizontally, the thresholds may be set for the vertical and horizontal sizes of the object for the determination process. In particular, when the approximate size and texture of an object are known regardless individual differences, this method allows easily determining whether the texture has been resolved based on the vertical and horizontal sizes of the image.

Now a method for determining the threshold will be described. The threshold differs depending on the actual size of the object and the texture on the object surface. If an object is the kind of object that includes a lot of texture (an object that includes spatial frequencies from low to high frequency), the distance can be estimated with little error, since the texture information is recorded in the image even if the object photographed in the image is small. In the case of such an object, the threshold is set to low. If an object does not have much texture, on the other hand, little texture is recorded, even if the object photographed in the image is large, and the distance estimation error in an area other than the edges of the object increases. Therefore in such a case, the threshold is set to high.

Even if objects of a same type are photographed, textures and actual sizes are not the same due to individual differences. However, determining a threshold all objects is not practical, therefore it is preferable to determine a threshold for each type of object. For example, one threshold could be used for human faces which do not have many individual differences. For vehicles, a predetermined threshold could be used for each type of vehicle, such as a passenger car, truck and bus, since the individual differences are minor within each type.

Now a case when it was determined that correction processing S104 is required in the size determination S103 will be described. The correction processing S104 is executed by the distance correction unit 12. Area information of the object and the depth map are inputted to the distance correction unit 12. Then the object area in the depth map that corresponds to the inputted object area is extracted, and the average distance of the object area is calculated. The calculated average distance is regarded as the representative value of the object area, and the depth map is updated by replacing the distance values in the object area in the depth map with the representative value. If there is a missing portion in the object area of the depth map (distance uncalculated portion) when the representative value is calculated, this portion is excluded for the calculation. A median or a mode may be calculated as the representative value, since in the case of a mean value, the calculated value is influenced by a value of which errors are major.

The object area to be corrected is a small area in the image, and in such an area, the depth map becomes more accurate by using a constant value, rather than by using the estimated distances which are dispersed by the influence of errors. Further, in an image, an object having a small area with respect to the actual size of the object indicates that this object is at a distance. Generally when the distance is estimated, estimation errors increase and distance resolution drops as the object becomes more distant. Therefore if the distance values of an object that exists at a distant location are represented by one distance value, then the distances without variation in the object can be acquired.

According to this embodiment, an object which has less texture and may have major distance estimation errors can be specified by the object detection and size determination. Moreover, the distances in a detected object are replaced with a representative value, whereby a depth map without a variation of distances in the object can be estimated. In this case, the distance information can also be determined for a portion of the object where distance information is missing, and a depth map free from defect can be generated. Further, the correction processing is not performed on a large object in the image, therefore the distances can be corrected without the distance resolution and the spatial resolution in the XY directions in the image deteriorating.

<Embodiment 2>

Figure 4:
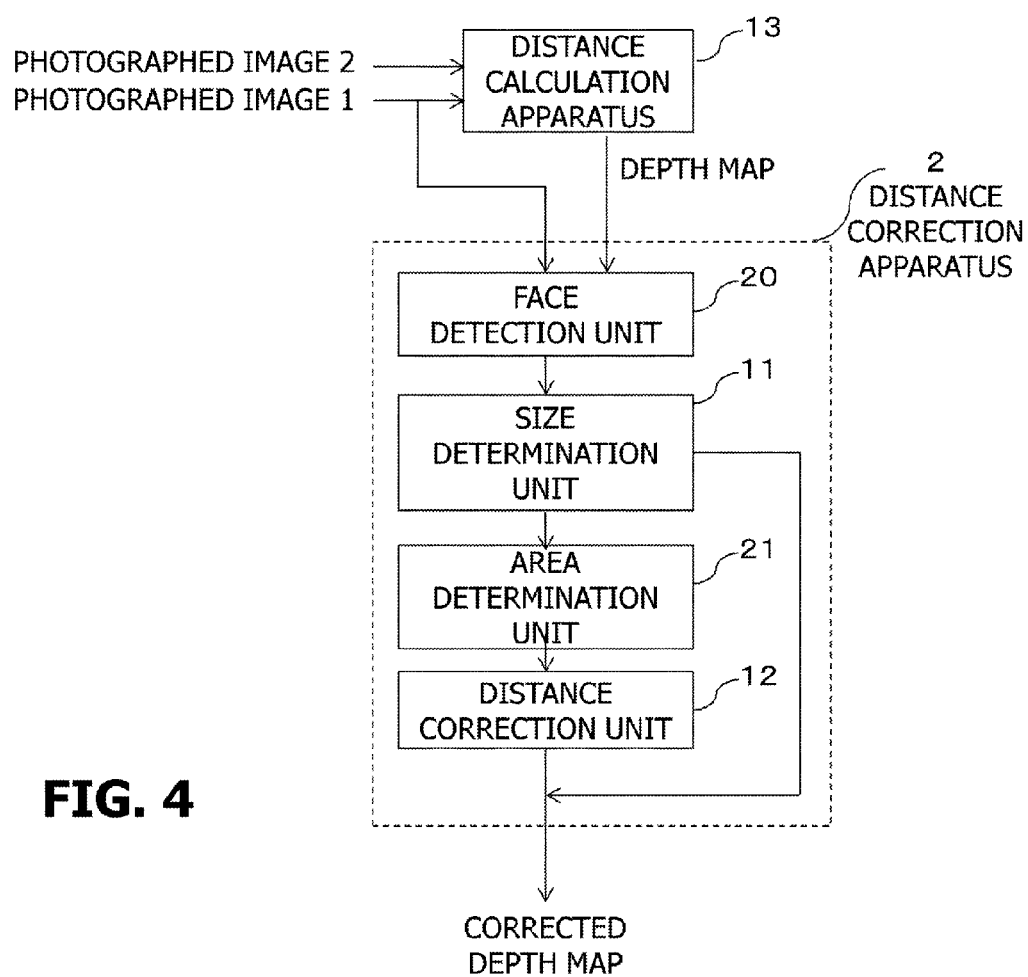
FIG. 4 is a block diagram depicting a configuration of an image processing apparatus according to Embodiment 2.

FIG. 4 is a block diagram depicting a configuration of an image processing apparatus according to Embodiment 2 of the present invention. The image processing apparatus is constituted by a distance calculation apparatus 13 and a distance correction apparatus 2. The distance correction apparatus 2 includes a face detection unit 20, a size determination unit 11, an area determination unit 21, and a distance correction unit 12.

A difference of Embodiment 2 from Embodiment 1 is that the object detection is specifically for a human face. As a consequence, in this embodiment, the face detection unit 20 is disposed instead of the object detection unit 10. Another difference from Embodiment 1 is that the area determination unit 21, for calculating a representative value of the distances, is disposed. In this embodiment, the area for which the representative value of the distances is calculated (target areas) can be different from the area detected by the detection unit. Hereafter, mainly the differences from Embodiment 1 will be described. A composing element similar to Embodiment 1 is denoted with the same reference symbol, for which description is basically omitted.

In Embodiment 2 as well, at least one of the images used for the distance estimation and the depth map are inputted, and the depth map is corrected according to the same flow as Embodiment 1.

Now the flow of the distance correction method (image processing method) by the image processing apparatus, according to this embodiment, will be described with reference to FIG. 5. FIG. 5 is a flow chart depicting the flow of the distance correction method according to this embodiment.

In the face detection processing S201, a facial area in the image is detected as shown in FIG. 6A using a method included in the imaging apparatus, such as a digital camera. Information detected at this time is, for example, the center coordinates of the facial area, the vertical and horizontal sizes of the face, and the coordinates of the left and right eyes. To detect a more accurate size of the face, the rolling angle and the yawing angle of the face may be saved as additional information. The detected facial information is stored in a memory or the like.

To more accurately detect the facial area, the skin color area in the detected area around the facial area (inside the facial area and peripheral area thereof) is detected as the facial area as shown in FIG. 6B, and the virtual and horizontal sizes and the detected area may be saved. In this case, the neck may be included in the facial area. Further, the center coordinates and the vertical and horizontal sizes of an elliptical area, including the head area as shown in FIG. 6C, may be saved. Furthermore, the hair area may be detected from the facial area as shown in FIG. 6D based on the hair color, and the area and the vertical and horizontal sizes of the total area of the face and hair may be saved as the facial area. The method for detecting a facial area and the area to be detected are not limited, but must be consistent since the threshold is set differently as mentioned later, depending on which portion of the detected area is regarded as the facial area.

Then the processing operations from S202 to S206 are repeatedly executed for the number of detected faces.

In the size determination processing S203, just like the case of a general object shown in Embodiment 1, the ratio between the vertical and horizontal sizes and the detected area (a number of pixels) of the face and the vertical and horizontal sizes and the area (a number of pixels) of the image is calculated. Then it is determined whether the calculated value is greater than the threshold, or the threshold or less. The threshold must be changed depending on which portion of the detected area is regarded as the facial area, as mentioned above. In the case of the facial area, it is preferable that the threshold is set to about 30% in terms of the ratio of the vertical size of the face to the size of the short side of the image.

If the detected face size is larger than the threshold, processing moves to S206, skipping the target area determination processing S204 and the correction processing S205.

If the detected facial size is the threshold or less, the target area determination processing S204 is executed. In Embodiment 1, the correction processing is performed regarding the detected object area as one area, but there is no need to always regard the entire object area as a same distance. In particular, if the detected object has distance differences within the object and the object size is close to the threshold, then distances may have to be roughly changed within the object. Considering such a case, the detected object area is divided into a plurality of areas by the target area determination processing S204. In this embodiment, the facial area is divided into a plurality of areas. For this division, various known methods can be used. For example, assuming that areas having similar colors are close to each other in distance, the facial area is divided into micro areas based on the distance in the color space.

Here the target area determination processing S204 is executed for an area after the face detection, but as shown in FIG. 7, the area division may be executed for the entire image, and each partial area where the area division result and the face detection result overlap may be divided. This means that the correction area determination processing need not always be executed after the face detection. As a standard to regard an overlap of the area division result and the face detection result, any one of "the divided area is completely included in the facial area", "a predetermined ratio of the divided area is included in the facial area", and "any part of the divided area is included in the facial area" can be used.

Then for each divided area of the facial area, a representative value is calculated in the correction processing S205, just like Embodiment 1, and the distance values in the area are replaced with the representative value.

In Embodiment 1, the representative value is calculated using the distance values of all the pixels of the detected area. In this embodiment, a different correction method is shown. In a target area, it is possible that a value of which distance is completely different may be included. If such a major singular value is included, the mean value may be affected by this singular value. To prevent this, a representative value is determined without using a distance, which is completely different from the average distance in the entire target area. To implement this determination, an average distance (temporary representative value) is calculated using the distances in the entire target area, and the representative value is determined using only the distance values of which difference from the average distance is small (the distance values of which difference is a predetermined value or less). This threshold can be determined using a standard deviation that is determined for the target area. Thereby a more accurate representative value can be calculated. This processing is effective not only when a mean value is used as the representative value, but also when a mode or a median is used instead.

The face detection function is already included in the imaging devices, such as digital cameras, hence the imaging processing apparatus of the present invention can easily be included in imaging devices.

Since human skin has little texture which causes major distance estimation errors, the effect of depth map correction is considerable. A human figure often becomes the main object in a photographic scene, and if a distance error occurs, especially in a facial area out of an entire human figure area, unnaturalness increases when various image processing are performed by using the depth map. By decreasing errors, as a result of missing distance data in the facial area, using this embodiment can generate a major effect.

This embodiment is different from the embodiment 1 as follows: the target is specifically a human face; the facial area is divided and correction processing is performed for each divided area; and the representative value is determined after excluding the singular values. These three differences need not always be used in combination. Using the divided areas as the target areas is especially effective when it is obvious that the distances in the area are different, where these differences can be clearly seen by the viewer, as in the case of a human face, but it is also effective for other objects. Needless to say, the configuration to determine the representative value after excluding the singular values may be used independently.

<Embodiment 3>

Embodiment 3 of the present invention will now be described. In Embodiment 1, the correction processing is performed by calculating a mean value or the like using all the estimated distance values in the object area. In Embodiment 2 as well, the correction processing is performed using the estimated distance values, excluding the singular values in the partial areas. In Embodiment 3 however, data other than the depth map is used, and the correction processing is performed using only highly reliable distances in the depth map. Hereafter mainly only the differences from Embodiment 1 will be described.

Figure 8:
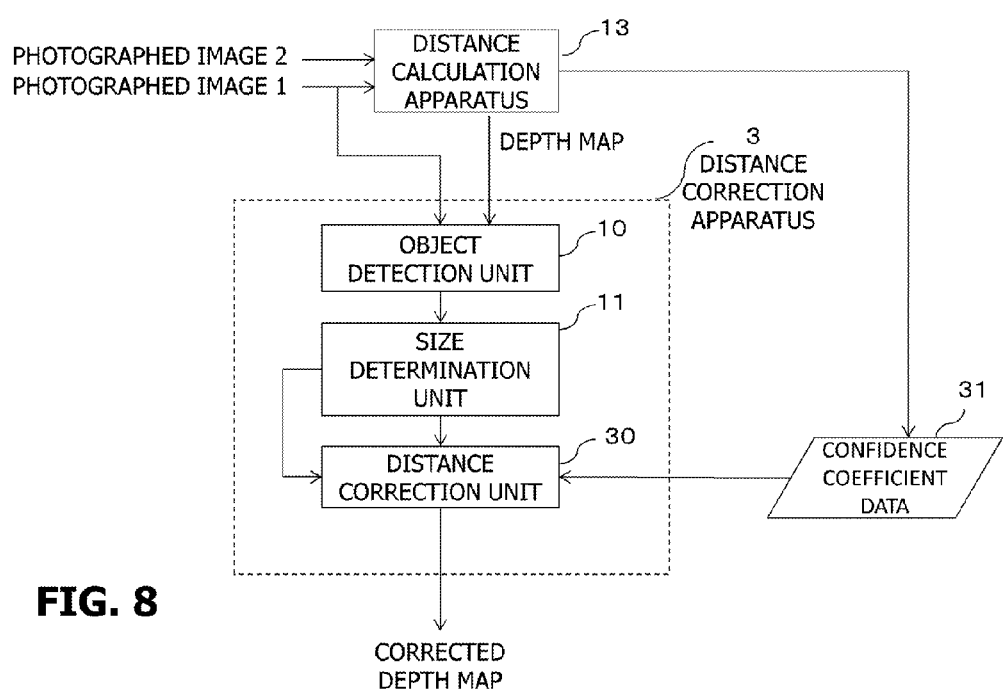
FIG. 8 is a block diagram depicting a configuration of an image processing apparatus according to Embodiment 3.

FIG. 8 is a block diagram depicting a configuration of an image processing apparatus according to Embodiment 3 of the present invention. The image processing apparatus is constituted by a distance calculation apparatus 13 and a distance correction apparatus 3. The distance correction apparatus 3 includes an object detection unit 10, a size determination unit 11, and a distance correction unit 30, using confidence coefficient data 31 for the distance correction unit 30.

When the distance calculation processing is executed, the distance calculation apparatus 13 according to this embodiment determines and saves the numeric data, which indicates the estimated accuracy upon estimating the depth map. The estimation accuracy can be determined for each pixel of the depth map. The numeric data which indicates this estimation accuracy is the confidence coefficient data 31. In the case of measuring a distance by the stereo method, for example, a degree of matching (correlation value) of the areas in two images can be used. In a low brightness area where the influence of noise is high (pixel area where brightness values are a threshold or less) or an area (pixel positions) where brightness is saturated, it is possible that the depth map cannot be estimated correctly, hence the confidence coefficient data may be used. In this case, binary confidence coefficient data, where the confidence coefficients in a low brightness area or a saturated area are "0", and those in other areas are "1", can be generated. The confidence coefficient of distance estimation is low in an area which has little texture, hence texture analysis may be performed so that the result is used as the confidence coefficient data. For the texture analysis, entropy, standard deviation or the like can be used. In other words, entropy or standard deviation is calculated for each local area in the photographed image, and this value is used as the confidence coefficient data. The confidence coefficient used here is not always one, but can be a plurality of confidence coefficient data. As mentioned above, the confidence coefficient data may be binary (whether the confidence coefficient is high or low) or may be a continuous value.

The image processing flow of this embodiment is the same as the flow of Embodiment 1 shown in FIG. 2, but a difference is the operation of the distance correction unit 30 in the correction processing S104.

The confidence coefficient data 31 is inputted to the distance correction unit 30. In the correction processing, the mean value (or another representative value) of the distances is calculated considering the inputted confidence coefficient data. When the means value of the distances is calculated here considering the confidence coefficient data, the means value is calculated using only the distance values at the pixel positions where the confidence coefficient is high (the confidence coefficient is a predetermined threshold or more), for example. If the confidence coefficient data is continuous values, the weighted mean value of the distances may be calculated using the confidence coefficient data as the weight (weighting coefficient), and this is also an example of the processing to calculate the main value of the distances considering the confidence coefficient data. Thereby the representative value can be calculated using data with less distance errors, and the representative value in the object area can be determined accurately. Moreover, even an area having a low confidence coefficient can be corrected with distances having a high confidence coefficient by replacing the distance values in the object area with the representative value.

A median or a mode may be used instead of the mean value, just like Embodiment 1.

As another method for extracting distances having high confidence coefficients, the distance information based on autofocus (AF) may be used. If the inputted depth map is an image representing the absolute distances, and the target object of the distance correction is the main object (focused object), the distance information based on AF can be used. The distances within the object area are compared with the AF distance values, and each distance of which this difference exceeds a threshold can be determined as a distance having a low confidence coefficient. For the threshold here, the depth size of the object, which is calculated based on the type and the size of the detected object, is used.

According to the distance correction of this embodiment, the confidence coefficient data and the AF distance information are used, thereby the representative value in the object area, which is detected using only distances having a high confidence coefficient, can be calculated. As a result, a representative value that does not depend on distance estimation errors can be estimated.

<Embodiment 4>

Embodiment 4 of the present invention will now be described. In all the embodiments described thus far, an object is automatically detected and the object size is determined. In Embodiment 4 however, interactive correction processing is performed, where the user who executes the image processing specifies the object area. Hereafter mainly differences from the above mentioned embodiments will be described.

Figure 9:
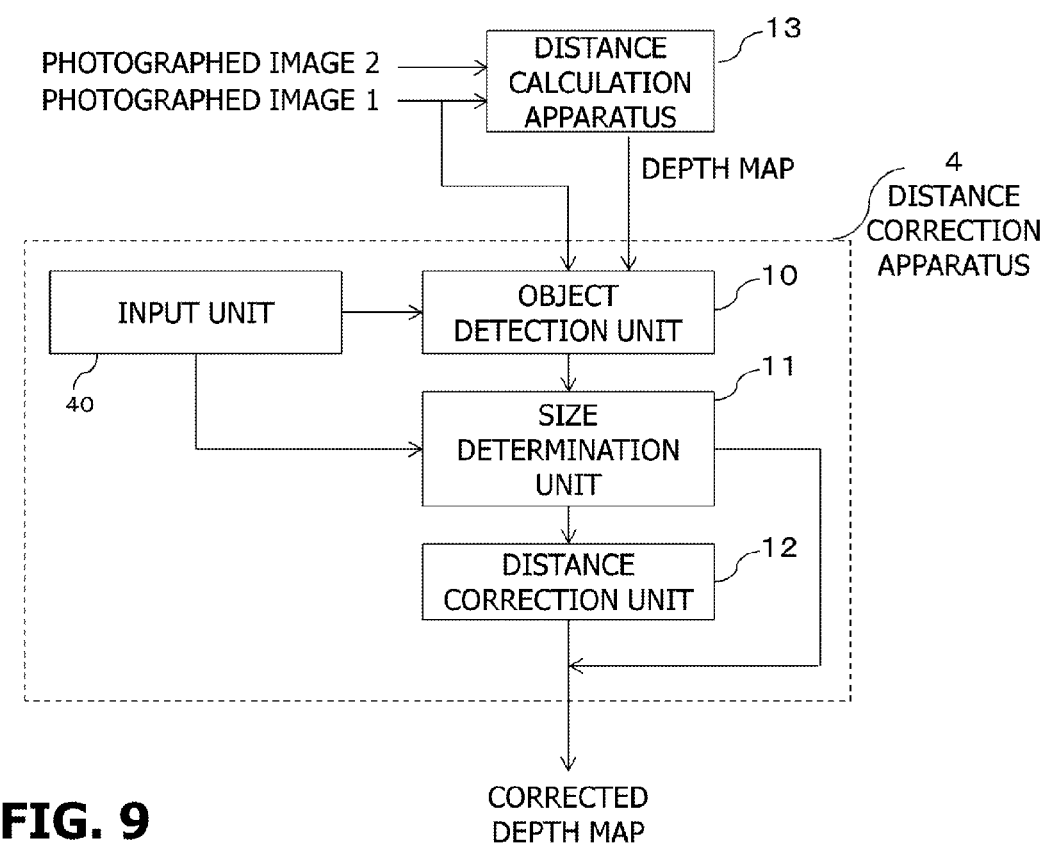
FIG. 9 is a block diagram depicting a configuration of an image processing apparatus according to Embodiment 4.

FIG. 9 is a block diagram depicting a configuration of an image processing apparatus according to Embodiment 4 of the present invention. The image processing apparatus is constituted by a distance calculation apparatus 13 and a distance correction apparatus 4. The distance correction apparatus 4 includes an object detection unit 10, a size determination unit 11, a distance correction unit 12 and an input unit 40, and uses the information inputted via the input unit 40 in the object detection unit 10 and the size determination unit 11.

The image processing flow of this embodiment is the same as the flow of Embodiment 1 shown in FIG. 2, except the operation in the distance correction apparatus 10.

When the object detection unit 10 executes the object detection S101, the input unit 40 operates and prompts the user to specify the object area. The user specifies the object area for an object that must be detected. Information to indicate the type of object is also inputted at this time. This input information is saved as the object detection result.

The input unit 40 may also input the threshold of the size of each object at the same time. The threshold inputted here is saved and used for determination by the size determination unit. Here the input unit 40 may input only one of the object detection result and the threshold.

According to this embodiment, the object detection errors generated in the automatic object detection can be reduced by the user manually specifying the object area. The user can also set the threshold of the size determination according to the required distance accuracy and spatial resolution.

<Embodiment 5>

Embodiment 5 of the present invention will now be described. The difference of this embodiment from the above mentioned embodiments is that a function to verify whether the distance acquired by the distance correction processing is an appropriate value or not is added. Here a case of adding the verification function to Embodiment 1 will be described.

Figure 10:
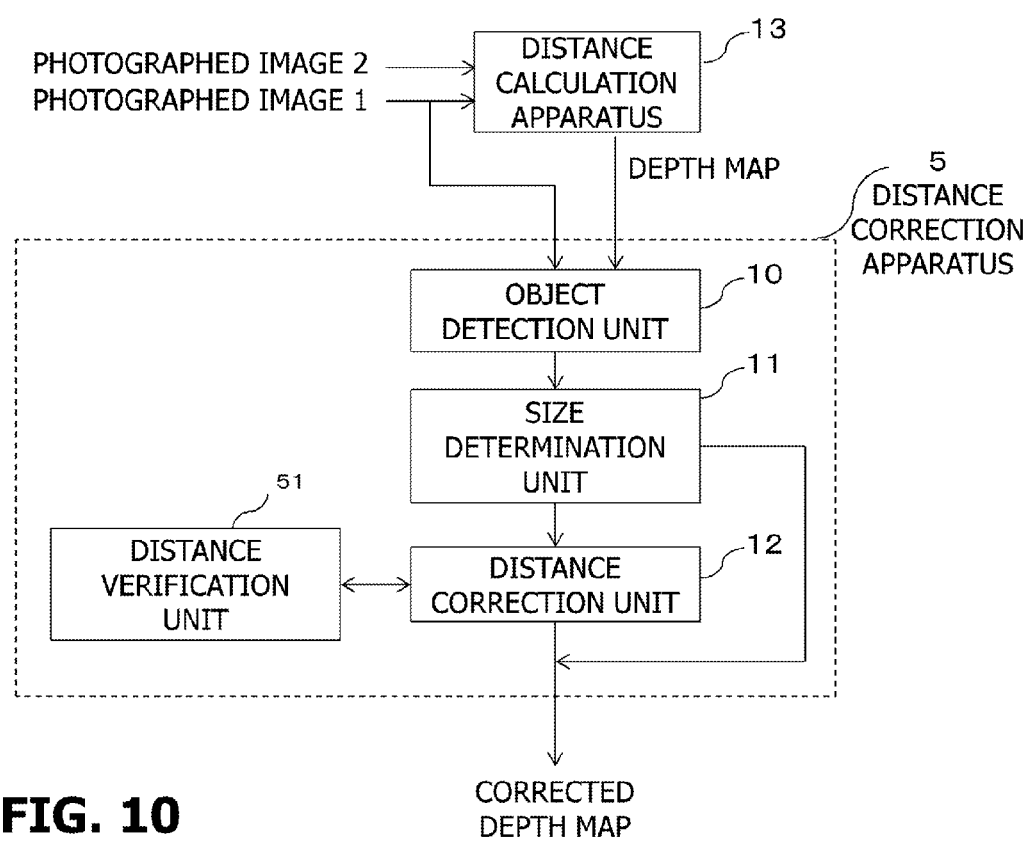
FIG. 10 is a block diagram depicting a configuration of an image processing apparatus according to Embodiment 5.

FIG. 10 is a block diagram depicting a configuration of an image processing apparatus according to Embodiment 5 of the present invention. The image processing apparatus is constituted by a distance calculation apparatus 13 and a distance correction apparatus 5. The distance correction apparatus 5 includes an object detection unit 10, a size determination unit 11, a distance correction unit 12 and a distance verification unit 51.

After the distance correction processing is performed on an object detected in the image, the distance verification unit 51 verifies whether the depth map acquired by the distance correction processing is appropriate or not. The verification processing by the distance verification unit 51 may be performed within each loop of steps S102 to S105 (that is, immediately after step S104) in the flow chart in FIG. 1, or may be performed for each detected object after exiting this loop (after step S105).

The distance verification unit 51 verifies whether the corrected depth map is appropriate or not according to the following procedure. First the distance verification unit 51 calculates the size of the detected object on the depth map, and the size of the object on the image side based on the pixel size. Further, the distance verification unit 51 calculates the photographing magnification from the absolute distance (representative value) to the target object after the correction and the corresponding absolute distance on the image side.

The actual size of the detected object can be determined from the size of the image and the photographing magnification. If the detected object is an object of which size is determined to some degree, as in the case of a human head, it can be determined whether the calculated size of the object is within the range of normal values. If the calculated size is outside the normal range, the distance verification unit 51 determines that an error occurred in the distance correction processing. The operation when an error is detected is not especially limited. For example, the generation of the error may be notified to the user, or may not be notified to the user. The distance correction processing may be cancelled so that the distance be restored to the former state, or the correction processing may be adopted as is, or adoption or rejection of the correction processing may be determined according to user input. Further, when an error occurs, the distance verification unit 51 may execute the distance correction processing again with changing the parameter set in the distance correction processing.

<Examples>

The description of the above embodiments is for describing the present invention using examples, and is not intended to limit the present invention. The individual composing elements of the above embodiments could be installed in combination. The configurations of the above embodiments can be modified within the scope of the technical concepts of the present invention. For example, the correction processing for the depth map is not limited to the correction processing in which the distances in the target area are unified to the representative value, but other correction processing methods, such as using a low-pass filter for the depth map in the target area, may be used.

The above mentioned distance correction technique of the present invention can be suitably applied to an imaging apparatus, such as a digital camera and a digital camcorder, or to an image processing apparatus, a computer or the like that performs image processing on image data acquired by an imaging apparatus. The technique of the present invention can also be applied to various electronic apparatuses (including a portable telephone, smartphone, straight type terminal and personal computer) that encloses this kind of imaging apparatus or image processing apparatus.

The distance correction technique of the present invention can also be applied to an imaging apparatus having a distance measurement function. The distance measurement function may be configured in any way. The distance measurement function may be incorporated into a computer that includes an imaging apparatus, so that the computer acquires an image photographed by the imaging apparatus, the distance is calculated based on this image, and this distance is corrected. The distance measurement function may be incorporated into a computer that can access a network by cable or wireless, so that the present invention is applied when the computer acquires a plurality of images via the network, and measures the distance based on these images. The acquired distance information can be used for various image processing operations, such as the area division of an image, the generation of a stereoscopic image or depth image, and the emulation of a blur effect.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-236590, filed on Nov. 15, 2013, which is hereby incorporated by reference herein in its entirety.

What is claimed is:

1. An image processing apparatus for correcting a depth map corresponding to an image, the image processing apparatus comprising:
a detection unit configured to detect an object included in the image;
a determination unit configured to determine whether the object detected by the detection unit is smaller than a predetermined size or larger than the predetermined size; and
a correction unit configured to correct distance information in a target area, the target area corresponding to an area of the object in the depth map, when the detected object is smaller than the predetermined size, and to not correct the distance information in the target area when the detected object is larger than the predetermined size,
wherein the correction unit is further configured to acquire a confidence coefficient of the distance information, which indicates an estimated accuracy of the distance information, at each position of the depth map, and to correct the distance information in the target area using only the distance information of which the confidence coefficient is equal to or greater than a predetermined value,
wherein the detection unit is further configured to determine a type of the detected object, and
wherein the determination unit is further configured to change the predetermined size depending on the type of the detected object.

2. The image processing apparatus according to claim 1, wherein the determination by the determination unit is made in accordance with at least one of a vertical length, a horizontal length, or an area of the detected object in the image.

3. The image processing apparatus according to claim 1, wherein the determination unit is further configured to decrease the predetermined size as the object has more texture.

4. The image processing apparatus according to claim 1, wherein the correction unit is further configured to replace distance information of pixels within a target area corresponding to the area of the object in the depth map with a representative value of the distance information in the target area.

5. The image processing apparatus according to claim 4, wherein the representative value is one of a mean value, a mode and a median of the distance information in the target area.

6. The image processing apparatus according to claim 4, wherein the correction unit is further configured to calculate a mean value of the distance information throughout the target area, and to calculate the representative value using only the distance information, a difference of which from the mean value is equal to or less than a predetermined value.

7. The image processing apparatus according to claim 4, wherein the correction unit is further configured to calculate the representative value, using only the distance information of which confidence coefficient is equal to or greater than a predetermined value.

8. The image processing apparatus according to claim 4, wherein the correction unit is further configured to calculate the representative value as the weighted mean value of the distance information, using the confidence coefficient as the weight.

9. The image processing apparatus according to claim 1, wherein the confidence coefficient in the image is calculated as low at pixels where the brightness is equal to or less than a predetermined value, and at pixels where the brightness is saturated.

10. The image processing apparatus according to claim 1, wherein an entropy or standard deviation is calculated for each local area of the image, and
wherein the confidence coefficient in the image is calculated as low at pixels where the entropy or standard deviation calculated is equal to or less than a predetermined value.

11. The image processing apparatus according to claim 1, wherein the confidence coefficient is calculated as low at pixels where the difference between the distance information by AF when the image was photographed, and the distance in the depth map, is equal to or more than a predetermined value.

12. The image processing apparatus according to claim 4, further comprising an area determination unit configured to divide the area of the object into a plurality of divided areas, and to determine each of the plurality of divided areas as the target area,
wherein the correction unit is configured to replace the distance information in the target area with a representative value of the distance information in the target area, for each of the target areas determined by the area determination unit.

13. The image processing apparatus according to claim 4, further comprising an area determination unit configured to divide the image into a plurality of divided areas, and to determine a divided area corresponding to the area of the object detected by the detection unit, out of the plurality of divided areas, as the target area,
wherein the correction unit is configured to replace the distance information in the target area with a representative value of the distance information in the target area, for each of the target areas determined by the area determination unit.

14. The image processing apparatus according to claim 4, further comprising a verification unit configured to calculate a size of the object based on a size of an area of the object in the image and the representative value, and to determine that an error has occurred when the calculated size is outside a normal range.

15. An image processing apparatus for correcting a depth map corresponding to an image, the image processing apparatus comprising:
a detection unit configured to detect a human face in the image;
a determination unit configured to determine whether the human face detected by the detection unit is smaller than a predetermined size or larger than the predetermined size; and
a correction unit configured to correct distance information in a target area that corresponds to an area of the detected human face in the depth map, when the detected human face is smaller than the predetermined size, and not to correct the distance information in the target area when the detected human face is larger than the predetermined size,
wherein the detection unit is further configured to determine a type of the detected human face, and
wherein the determination unit is further configured to change the predetermined size depending on the type of the detected human face.

16. The image processing apparatus according to claim 15, wherein the target area is one of (a) a skin color area near a facial area detected by the detection unit, (b) a skin color area and a hair area near the facial area, and (c) one or more divided areas corresponding to the facial area, in a case that the image is divided into divided areas.

17. The image processing apparatus according to claim 1, further comprising a distance calculation unit configured to generate a depth map based on a plurality of images of different viewpoints, or a plurality of images which are different in the degree of blur,
wherein the image processing apparatus is configured to correct the depth map, using at least one of a plurality of images and the depth map.

18. An imaging apparatus, comprising:
an imaging unit; and
the image processing apparatus according to claim 17,
wherein the distance calculation unit generates a depth map based on a plurality of images of different viewpoints or the plurality of images which are different in degree of blur, image-captured by the imaging unit.

19. A distance correction method executed by a computer for correcting a depth map corresponding to an image, the distance correction method comprising:
a detection step of detecting an object included in the image;
a determination step of determining whether the object detected in the detection step is smaller than a predetermined size or larger than the predetermined size; and
a correction step of correcting distance information in a target area in the depth map that corresponds to an area of the object, when the detected object is smaller than the predetermined size, and not correcting the distance information on the target area when the detected object is larger than the predetermined size,
wherein the correction step comprises acquiring a confidence coefficient of the distance information, which indicates an estimated accuracy of the distance information, at each position of the depth map, and correcting the distance information in the target area using only the distance information of which the confidence coefficient is equal to or greater than a predetermined value,
wherein the detection step comprises determining a type of the detected object, and
wherein the determination step comprises changing the predetermined size depending on the type of the detected object.

20. A non-transitory computer-readable recording medium recorded with a program allowing a computer to execute each step of the distance correction method according to claim 19.

21. The image processing apparatus according to claim 1, wherein the distance information indicates a distance or a value corresponding to a distance.

22. The image processing apparatus according to claim 1, wherein the confidence coefficient is calculated as low at a pixel which has little texture.

23. A distance correction method executed by a computer for correcting a depth map corresponding to an image, the distance correction method comprising:
a detection step of detecting a human face included in the image;
a determination step of determining whether the human face detected in the detection step is smaller than a predetermined size or larger than the predetermined size; and
a correction step of correcting distance information in a target area in the depth map that corresponds to an area of the detected human face, when the detected human face is smaller than the predetermined size, and not correcting the distance information on the target area when the detected human face is larger than the predetermined size,
wherein the determination step comprises determining a type of the detected human face, and
wherein the determination step comprises changing the predetermined size depending on the type of the detected human face.

24. A non-transitory computer-readable recording medium recorded with a program allowing a computer to execute each step of the distance correction method according to claim 23.

25. The image processing apparatus according to claim 1, wherein the object is a human face.

26. The distance correction method according to claim 19, wherein the object is a human face.

* * * * *